Patented Sept. 17, 1940

2,215,209

UNITED STATES PATENT OFFICE 2,215,209

FROST-RESISTANT GLASS

Fred Cornetto, Washington, Pa., assignor of one-fourth to Maurice M. Sullivan, Pittsburgh, Pa.

No Drawing. Application August 26, 1939,
Serial No. 292,119

11 Claims. (Cl. 106—36.1)

This invention relates to frost-resistant glass.

In various uses of glass the formation of frost or ice thereon is not only annoying but may be actually dangerous. Especially is this true of glass used in automotive vehicles, particularly windshields. It is objectionable also in other uses of glass where frost or ice formation may reduce or prevent the passage of light, or sufficient light, for adequate vision, the giving of various types of signals, and other purposes.

It is among the objects of the invention to provide glasses which are more resistant to frost formation than those heretofore available.

Another object is to provide frost-resistant glasses by a simple and easily practiced method which does not interfere with standard or established glass-making procedures, does not require objectionable alteration of standard glass batches, or glass-forming compositions, does not objectionably increase the cost of glass articles, and does not increase the difficulties of manufacture or manufacturing control.

Still another object is to provide batches for making frost-resistant glasses from standard glass-making materials together with inexpensive materials which are readily available wherever glass is manufactured.

Other objects will appear from the following description.

The invention is predicated upon my discovery that the tendency to formation of frost on glass may be repressed by a simple modification which is applicable generally, as far as I am aware, to glass-forming compositions generally. In accordance with the invention the glass-forming batch is mixed with alcohol and water and after the liquids have been thoroughly incorporated throughout the batch the mixture is heated to dryness. Thereafter it is melted, treated, and formed into articles in accordance with standard practice.

In addition to the treatment with alcohol and water which is an essential feature of the invention, the best results are obtained by the use of batches containing substantial amounts of common salt (NaCl) and baking soda (NaHCO₃), as I have found that glasses produced from such batches and treated with liquid as just described are of substantially improved frost-resisting character.

The invention is not restricted to the production of glass for any specific purpose, but is applicable generally to the manufacture of glasses in the use of which it is desirable to avoid or delay the formation of frost, or ice, as compared with the glasses available prior to this invention. For that reason it is applicable generally to glass-forming compositions intended for the manufacture of glasses for such purposes. For the same reason it is not possible to define all of the glass-forming compositions to which the invention is applicable in terms of their precise ingredients and proportions of ingredients, but as appears from what has been said the invention resides in the mixing of such batches with alcohol and water, and preferably in the use of batches additionally containing salt and baking soda. However, the invention may be illustrated further with reference to the following example.

In one test the invention was applied to the making of a frost-resistant glass from a standard, commercially used glass batch having the following composition:

| | Pounds |
|---|---|
| Sand | 385 |
| Limestone | 125 |
| Soda ash | 120 |
| Salt cake | 33 |
| Charcoal | 2.25 |
| Arsenic | 2.75 |

In accordance with the invention there were added to the foregoing batch 120 pounds of common salt and 12.5 pounds of baking soda. After these ingredients had been carefully incorporated in the foregoing batch there were added 60 pounds of ethyl alcohol and 20 pounds of water, and the whole was thoroughly mixed to distribute the added liquids uniformly and completely throughout the batch. The mixture was then heated until it was dry, whereupon the dried material was melted to produce the glass which was then formed into articles.

The improved character of glasses made in accordance with the invention is illustrated by tests in which glass formed from the standard batch just given was compared with pieces of glass of substantially the same shape and size made from that batch in accordance with the invention as just described. Sheets of each glass were placed in separate dishes of the same size and covered with the same amounts of water. They were then placed side by side in a mechanical refrigerator and held there until a film of ice had formed completely over the surfaces of the glass sheets. This occurred with the glass made from the standard, unmodified batch thirty to thirty-five minutes sooner than it did with the glass made from the same base composition treated in accordance with this invention. Likewise, when the containers were removed from the refrigerator the ice film formed over the glass made in accordance with this invention melted much more rapidly than in the case of the standard glass used for comparative testing purposes.

These tests, as well as others which I have performed, show that glasses made in accordance with the present invention frost or ice over more slowly than glasses made according to standard practice prior to my invention. They will therefore resist the formation of frost for substantial periods of time as compared with other glasses, and thus they tend to obviate the disadvantages of frost formation upon glass. As an example of the benefit of this, a not uncommon experience of automobile drivers is to encounter freezing conditions which are of relatively short duration. With the glasses now used in automobile windshields the tendency is for the windshield to frost over promptly, making driving hazardous and difficult. Windshields made from glass produced in accordance with this invention will, however, frost over at a substantially slower rate, and in many instances the resistance to frost formation will be sufficiently great that the conditions causing frost will have passed before the windshield has become frosted.

The capability of glass made in accordance with this invention to resist the formation of frost appears to demonstrate itself likewise in resistance to dew formation which causes glass to fog over, so that the invention is valuable equally in that respect.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. That method of making a frost-resistant glass which comprises mixing a glass-forming batch with alcohol and water, heating the mixture to dryness, then melting the thus treated batch, and forming glass articles from the melt.

2. That method of making a frost-resistant glass which comprises providing a glass-forming batch containing substantial amounts of common salt and baking soda, mixing said batch with alcohol and water, heating the mixture to dryness, then melting the thus treated batch, and forming glass articles from the melt.

3. That method of making a frost-resistant glass which comprises adding to a glass-forming batch 15 to 20 per cent of common salt and 1 to 2 per cent of sodium bicarbonate, mixing with the batch substantial amounts of alcohol and water, then heating the mixture to dryness, melting the thus treated batch, and forming glass articles from the batch.

4. That method of making a frost-resistant glass which comprises adding to a glass-forming batch 15 to 20 per cent of common salt, and 1 to 2 per cent of sodium bicarbonate, mixing the batch with from 5 to 15 per cent of alcohol and from 1 to 5 per cent of water, heating said mixture to dryness, then melting the thus treated batch, and forming glass articles from the batch.

5. That method of making a frost-resistant glass which comprises adding substantial amounts of alcohol and water to a glass-forming batch composed of, in parts by weight, about 385 parts of sand, 125 parts of limestone, 120 parts of soda ash, 33 parts of salt cake, 2.25 parts of charcoal and 2.75 parts of arsenic, mixing thoroughly, heating the mixture to dryness, then melting the thus treated batch, and forming glass articles from the batch.

6. That method of making a frost-resistant glass which comprises providing a glass-forming batch composed of, in parts by weight, about 385 parts of sand, 125 parts of limestone, 120 parts of soda ash, 33 parts of salt cake, 2.25 parts of charcoal and 2.75 parts of arsenic, mixing with said batch about 60 parts of alcohol and 20 parts of water, heating the mixture to dryness, then melting the thus treated batch, and forming glass articles from the batch.

7. That method of making a frost-resistant glass which comprises adding alcohol and water to a glass-forming batch composed of, in parts by weight, about 385 parts of sand, 125 parts of limestone, 120 parts of soda ash, 33 parts of salt cake, 2.25 parts of charcoal, 2.75 parts of arsenic, 120 parts of common salt, and 12.5 parts of baking soda, mixing therewith about 60 parts of alcohol and 20 parts of water, heating the mixture to dryness, then melting the thus treated batch, and forming glass articles from the batch.

8. A batch for making glass, comprising, in addition to usual glass-forming constituents, substantial amounts of alcohol and water.

9. A batch for making glass, comprising, in addition to usual glass-forming constituents, substantial amounts of common salt, sodium bicarbonate, alcohol and water.

10. A batch for making frost-resistant glass comprising, in parts by weight, about 385 parts of sand, 125 parts of limestone, 120 parts of soda ash, 33 parts of salt cake, 2.25 parts of charcoal, 2.75 parts of arsenic, 60 parts of ethyl alcohol, and 20 parts of water.

11. A batch for making frost-resistant glass comprising, in parts by weight, about 385 parts of sand, 125 parts of limestone, 120 parts of soda ash, 33 parts of salt cake, 2.25 parts of charcoal, 2.75 parts of arsenic, 120 parts of common salt, 60 parts of ethyl alcohol, 12.5 parts of sodium bicarbonate, and 20 parts of water.

FRED CORNETTO.